(12) United States Patent
Wang et al.

(10) Patent No.: US 10,893,209 B2
(45) Date of Patent: Jan. 12, 2021

(54) PHOTOGRAPHING DIRECTION DEVIATION DETECTION METHOD, APPARATUS, DEVICE, AND STORAGE MEDIUM

(71) Applicant: TENCENT TECHNOLOGY (SHENZHEN) COMPANY LIMITED, Shenzhen (CN)

(72) Inventors: Dafeng Wang, Shenzhen (CN); Jianye Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/412,576

(22) Filed: May 15, 2019

(65) Prior Publication Data

US 2019/0268541 A1 Aug. 29, 2019

Related U.S. Application Data

(63) Continuation of application No. PCT/CN2018/075383, filed on Feb. 6, 2018.

(30) Foreign Application Priority Data

Feb. 16, 2017 (CN) .......................... 2017 1 0084422

(51) Int. Cl.
*H04N 5/232* (2006.01)
*H04N 7/18* (2006.01)
(Continued)

(52) U.S. Cl.
CPC ......... *H04N 5/23299* (2018.08); *G01C 15/00* (2013.01); *G07C 5/08* (2013.01); *H04N 7/183* (2013.01); *H04N 7/188* (2013.01)

(58) Field of Classification Search
CPC .................................................. H04N 5/23299
See application file for complete search history.

(56) References Cited

U.S. PATENT DOCUMENTS

2010/0070162 A1  3/2010  Aihara
2010/0100284 A1* 4/2010  Kudo ................... B62D 15/025
                                              701/42
(Continued)

FOREIGN PATENT DOCUMENTS

CN    102278987 A    12/2011
CN    103606209 A    2/2014
(Continued)

OTHER PUBLICATIONS

Car driving recording device (Year: 2012).*
(Continued)

*Primary Examiner* — Eileen M Adams
*Assistant Examiner* — Daniel T Tekle
(74) *Attorney, Agent, or Firm* — Anova Law Group, PLLC

(57) ABSTRACT

A photographing direction deviation detection method is provided for a deviation detection device. The method includes obtaining a horizontal acceleration of an image capturing device at each of a plurality of time points in a pre-determined time period, and determining a target photographing direction of the image capturing device according to the horizontal acceleration at each of the time points. The method also includes, when a direction angle satisfies a preset condition, determining that an actual photographing direction of the image capturing device deviates, where the direction angle is an angle between the target photographing direction and the actual photographing direction of the image capturing device at an end time point of the pre-determined time period.

20 Claims, 6 Drawing Sheets

(51) Int. Cl.
*G07C 5/08* (2006.01)
*G01C 15/00* (2006.01)

(56) References Cited

U.S. PATENT DOCUMENTS

| | | | |
|---|---|---|---|
| 2011/0257920 A1 | 10/2011 | Onda et al. | |
| 2012/0048014 A1 | 3/2012 | Loomis et al. | |
| 2012/0323449 A1* | 12/2012 | Kim | B62D 41/00 |
| | | | 701/49 |
| 2013/0174660 A1 | 7/2013 | Imasaka et al. | |
| 2013/0231861 A1 | 9/2013 | Yokoyama et al. | |
| 2015/0226621 A1 | 8/2015 | Zhu et al. | |
| 2016/0318454 A1 | 11/2016 | Liu | |

FOREIGN PATENT DOCUMENTS

| | | |
|---|---|---|
| CN | 104537729 A | 4/2015 |
| CN | 204680071 U | 9/2015 |
| CN | 105513163 A | 4/2016 |
| CN | 105894607 A | 8/2016 |
| CN | 106060392 A | 10/2016 |
| EP | 2080983 A1 | 7/2009 |
| JP | 2009281799 A | 12/2009 |
| JP | 2010154304 A | 7/2010 |
| JP | 2010286278 A | 12/2010 |
| JP | 2016139914 A | 8/2016 |
| KR | 101001842 B1 | 12/2010 |
| WO | 2012066668 A1 | 5/2012 |

OTHER PUBLICATIONS

Shake intelligent Automobile Device (Year: 2012).*
Automobile Cameras (Year: 2013).*
Automobile Data Recording Device (Year: 2013).*
The World Intellectual Property Organization (WIPO) International Search Report for PCT/CN2018/075383 dated May 9, 2018 7 Pages (including translation).
The Japan Patent Office (JPO) Notification of Reasons for Refusal for Application No. 2019-525979 and Translation dated Aug. 3, 2020 8 Pages.
Korean Intellectual Property Office (KIPO) Office Action 1 for 20197017115 dated Jun. 25, 2020 7 Pages (including translation).
The State Intellectual Property Office of the People's Republic of China (SIPO) Office Action 1 for 201710084422.5 dated Apr. 29, 2020 10 Pages (including translation).
The European Patent Office (EPO), The Extended European Search Report for 18754577.7, Sep. 28, 2020, 5 Pages.

* cited by examiner

PHOTOGRAPHING DIRECTION DEVIATION DETECTION METHOD, APPARATUS, DEVICE, AND STORAGE MEDIUM

RELATED APPLICATIONS

This application is a continuation application of PCT Patent Application No. PCT/CN2018/075383, filed on Feb. 6, 2018, which claims priority to Chinese Patent Application No. 201710084422.5, entitled "PHOTOGRAPHING DIRECTION DEVIATION DETECTION METHOD AND APPARATUS" filed with the Chinese Patent Office on Feb. 16, 2017, content of all of which is incorporated by reference in its entirety.

FIELD OF TECHNOLOGY

This application relates to the field of computer technologies and, in particular, to a photographing direction deviation detection method, an apparatus, a device, and a storage medium.

BACKGROUND

With continuous improvement of people's awareness on traffic security, image capturing devices (for example, driving recorders) fixedly disposed in vehicles, such as automobiles, are more widely applied.

In the related technology, when mounting an image capturing device in a vehicle, a user may set a photographing direction of the image capturing device according to an actual requirement. Due to uncontrollable circumstances, such as jolting or bumping during movement of the vehicle, the photographing direction of the image capturing device may deviate, leading to a blind monitoring spot in an image captured by the image capturing device and affecting the image capturing effect of the image capturing device. Therefore, currently, a user needs to periodically manually detect whether a photographing direction of the image capturing device mounted in a vehicle deviates.

In actual applications, because the user may not pay attention to the photographing direction of the driving recorder at all time, the user may not perceive deviation of the photographing direction in time. In addition, accuracy of manually checking whether the photographing direction of the driving recorder deviates by the user is relatively low.

SUMMARY

To resolve problems in the related technology that a user may not perceive deviation of a photographing direction of a driving recorder in time, and that accuracy of manually checking whether a photographing direction of a driving recorder deviates is low, embodiments of the present disclosure provide a photographing direction deviation detection method, an apparatus, a device, and a storage medium.

According to one aspect, a photographing direction deviation detection method is provided for a deviation detection device. The method includes obtaining a horizontal acceleration of an image capturing device at each of a plurality of time points in a pre-determined time period, and determining a target photographing direction of the image capturing device according to the horizontal acceleration at each of the time points. The method also includes, when a direction angle satisfies a preset condition, determining that an actual photographing direction of the image capturing device deviates, where the direction angle is an angle between the target photographing direction and the actual photographing direction of the image capturing device at an end time point of the pre-determined time period.

According to another aspect, a photographing direction deviation detection apparatus is provided. The apparatus includes an image capturing device for capturing images in an actual photographing direction; and a deviation detection device for determining whether the actual photographing direction deviates from a target photographing direction. The deviation detection device is configured to perform: obtaining a horizontal acceleration of an image capturing device at each of a plurality of time points in a pre-determined time period; determining the target photographing direction of the image capturing device according to the horizontal acceleration at each of the time points; and when a direction angle satisfies a preset condition, determining that the actual photographing direction of the image capturing device deviates. The direction angle is an angle between the target photographing direction and the actual photographing direction of the image capturing device at an end time point of the pre-determined time period.

According to another aspect, a non-transitory computer-readable storage medium is provided. The non-transitory computer-readable storage medium stores computer program instructions executable by at least one processor to perform: obtaining a horizontal acceleration of an image capturing device at each of a plurality of time points in a pre-determined time period, the image capturing device being configured for capturing images in an actual photographing direction; determining a target photographing direction of the image capturing device according to the horizontal acceleration at each of the time points; and when a direction angle satisfies a preset condition, determining that the actual photographing direction of the image capturing device deviates. The direction angle being is angle between the target photographing direction and the actual photographing direction of the image capturing device at an end time point of the pre-determined time period.

It should be understood that, the foregoing general descriptions and the following detailed descriptions are merely for illustration and explanation purposes and are not intended to limit the present disclosure.

BRIEF DESCRIPTION OF THE DRAWINGS

The accompanying drawings, which constitute a part of this specification, illustrate embodiments consistent with the present disclosure and, together with the specification, serve to explain the present disclosure.

DESCRIPTION OF EMBODIMENTS

Figure 1:
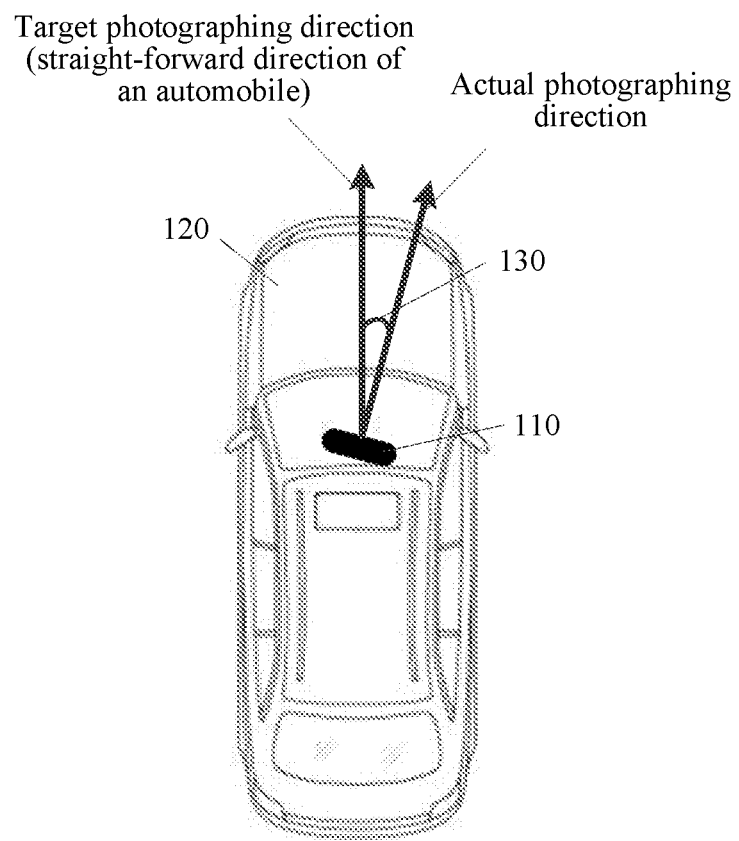
FIG. 1 is a schematic diagram of an application scenario according to the present disclosure.

Exemplary embodiments are described in detail herein together with the accompanying drawings. Unless indicated otherwise, same numbers in different accompanying drawings represent same or similar elements. The implementations described in the following exemplary embodiments do not represent all implementations consistent with the present disclosure. Rather, the implementations are merely examples of apparatuses and methods that are described in detail in the appended claims and that are consistent with certain aspects of the present disclosure.

The technical solutions in the embodiments of the present disclosure may be applied to a photographing-direction deviation detection device. The deviation detection device correspondingly has a movable image capturing device. The image capturing device may be fixedly mounted in a vehicle. Specifically, for example, the image capturing device may be an image capturing assembly (for example, a camera assembly) in a driving recorder of an automobile, and the deviation detection device may be a computing component in the driving recorder. Alternatively, the deviation detection device may be a computer device (for example, an in-vehicle computer, or a smartphone) connected to the driving recorder in a wired or wireless manner.

According to the embodiments of in the present disclosure, when the image capturing device is moving, the deviation detection device may obtain a horizontal acceleration of the image capturing device at each time point in a pre-determined time period, determine a target photographing direction of the image capturing device according to the horizontal accelerations at the time points, and determine, when a direction angle satisfies a preset condition, whether an actual photographing direction of the image capturing device deviates. The direction angle is an angle between the target photographing direction and the actual photographing direction of the image capturing device at an end time point of the pre-determined time period.

The target photographing direction may be a desired photographing direction of the image capturing device preset by a user. When mounting the image capturing device in the vehicle or any other carrier, the user usually sets the target photographing direction of the image capturing device to be a fixed direction corresponding to a posture or attitude of the vehicle or the carrier. For example, the user may set the target photographing direction to be a straight-forward direction of the vehicle, or to a direction leftward or rightward relative to the straight-forward direction of the vehicle by a pre-determined angle, or the like. In actual applications, the vehicle moves in the straight-forward direction of the vehicle in most cases, the target photographing direction of the image capturing device is the fixed direction corresponding to the attitude of the vehicle, and the image capturing device and the vehicle have the same movement state. Therefore, an attitude parameter of the vehicle (for example, the straight-forward direction of the vehicle) can be estimated by obtaining only an acceleration of the image capturing device at each time point during the movement. The target photographing direction of the image capturing device is determined with reference to the estimated attitude parameter of the vehicle. Then, whether the actual photographing direction of the image capturing device deviates can be determined with reference to an angle between the actual photographing direction of the image capturing device and the estimated target photographing direction.

For example, FIG. 1 is a schematic diagram of an application scenario according to the present disclosure. An example is used in which the image capturing device is a camera assembly in a driving recorder 110, and the vehicle is an automobile 120. In one aspect, a straight-forward direction of the automobile 120 is fixed relative to a target photographing direction of the camera assembly in the driving recorder 110. For example, as shown in FIG. 1, the target photographing direction may be the straight-forward direction of the automobile 120 (where in actual applications, the target photographing direction may alternatively form a preset angle with the straight-forward direction of the automobile 120). In another aspect, during traveling, the automobile 120 moves in the straight-forward direction for most of the time, and rarely turns or reverses, and the driving recorder 110 is fixedly disposed in the automobile 120. Based on this feature, the straight-forward direction of the automobile 120 may be determined according to a moving state of the driving recorder 110, and the moving state of the driving recorder 110 may be obtained by monitoring an acceleration of the driving recorder 110. With reference to the foregoing two aspects, when the automobile 120 is moving, a direction angle 130 between the target photographing direction of the camera assembly in the driving recorder 120 (that is, the straight-forward direction of the automobile 120) and an actual photographing direction of the camera assembly in the driving recorder 120 at an end time point of a time period can be estimated by obtaining acceleration of the driving recorder 120 in a specific time period, and then whether the actual photographing direction of the driving recorder 110 deviates can be determined according to the direction angle 130.

According to the embodiments of the present disclosure, when the image capturing device is moving, the deviation detection device can estimate the target photographing direction of the image capturing device by obtaining only the horizontal acceleration of the image capturing device at each time point, and determine, based on the target photographing direction, whether the actual photographing direction of the image capturing device deviates. In this way, the photographing direction of the image capturing device does not need to be manually checked by the user, and timeliness and accuracy of detecting whether the photographing direction of the image capturing device deviates are improved.

Figure 2:
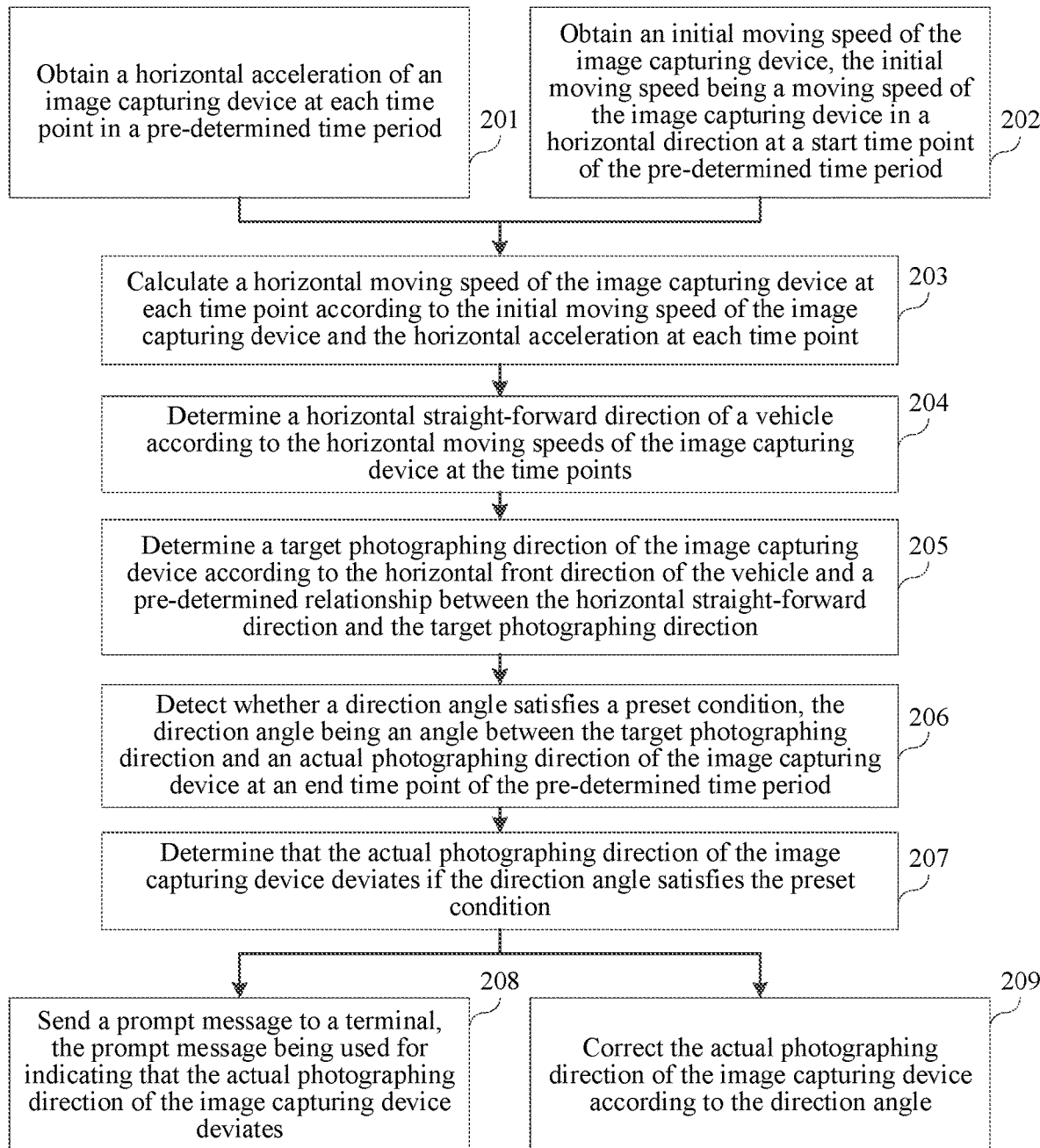
FIG. 2 is a flowchart of a photographing direction deviation detection method according to the present disclosure.

FIG. 2 is a flowchart of a photographing direction deviation detection method according to an exemplary embodiment. The method may be applied to a deviation detection device. The deviation detection device correspondingly has an image capturing device fixedly mounted in a vehicle. The photographing direction deviation detection method may include the following steps.

Step 201: Obtaining horizontal acceleration of an image capturing device at each time point in a pre-determined time period.

According to the embodiments of the present disclosure, the horizontal acceleration and a subsequent moving speed (including an initial moving speed and a horizontal moving speed) are all vectors including a value and a direction. To be specific, the horizontal acceleration includes an acceleration value and an acceleration direction, and the moving speed includes a speed value and a moving direction.

Both the directions of the horizontal acceleration and the moving speed are directions relative to the image capturing device. The direction of the horizontal acceleration or the moving speed may be a direction relative to a horizontal straight-forward direction of the image capturing device, in a three-dimension coordinate system. For example, the direction of the horizontal acceleration or the moving speed may deviate leftward or rightward from the horizontal straight-forward direction of the image capturing device by an angle.

Figure 3:
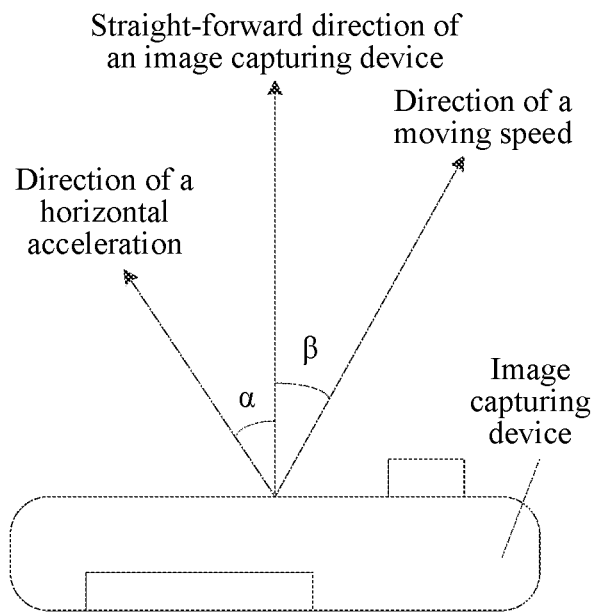
FIG. 3 is a schematic diagram of a direction of a horizontal acceleration and a direction of a moving speed according to the method shown in FIG. 2.

Specifically, FIG. 3 is a schematic diagram of a direction of a horizontal acceleration and a direction of a moving speed according to an embodiment of the present disclosure. The directions of the horizontal acceleration and the moving speed may deviate relative to the straight-forward direction of the image capturing device by an angle. For example, in FIG. 3, the direction of the horizontal acceleration may deviate leftward from the straight-forward direction of the image capturing device by an angle α. Similarly, in FIG. 3, the direction of the moving speed may deviate rightward from the straight-forward direction of the image capturing device by an angle β.

Optionally, the method may be performed by the deviation detection device. For example, the deviation detection device may obtain sensor data of an acceleration sensor (G-Sensor) disposed corresponding to the image capturing device, and obtain the horizontal acceleration of the image capturing device at each time point of the pre-determined time period according to the sensor data.

The acceleration sensor may be a sensor disposed inside the image capturing device. Alternatively, the acceleration sensor may be disposed outside or external to the image capturing device. In addition, a position of the acceleration sensor relative to the image capturing device is fixed. For example, when the image capturing device is fixedly disposed in the vehicle, the acceleration sensor may also be an acceleration sensor built in the vehicle.

The pre-determined time period may be the entire or part of the time period from the time when the image capturing device starts to move to when the image capturing device stops.

Optionally, in actual applications, when moving along a straight or a near-straight path, the vehicle is very likely to move in a straight-forward direction of the vehicle, in other words, a moving direction in this case is the closest to the straight-forward direction of the vehicle. In one embodiment of the present disclosure, to improve accuracy of subsequent determining of the horizontal straight-forward direction of the vehicle, when obtaining the horizontal acceleration of the image capturing device at each time point of the pre-determined time period, the deviation detection device may determine a time period during which the image capturing device is moving along a straight or near-straight line as the pre-determined time period.

For example, the image capturing device is an image capturing assembly in a driving recorder, and the deviation detection device is a computing assembly in the driving recorder. The driving recorder includes an acceleration sensor and a processor (that is, the computing assembly). After the driving recorder is powered on, the processor continuously obtains sensor parameters (where the acceleration sensor and the processor may be connected through a bus in the driving recorder) obtained by the acceleration sensor through measurement, and obtains an acceleration of the driving recorder at each time point according to the obtained sensor parameters. The processor in the driving recorder can determine, according to the obtained accelerations, a moving state of an automobile (that is, whether the automobile is moving, whether the automobile is moving along a straight line, or the like). To determine whether a photographing direction of the driving recorder deviates, the processor in the driving recorder may determine, according to the moving state of the automobile, a time period during which the driving recorder is moving along a straight line or a near-straight line in the movement of the driving recorder as the pre-determined time period, and obtain a horizontal acceleration at each time point of the pre-determined time period.

Optionally, the deviation detection device may receive the sensor parameters of the acceleration sensor at a time interval. For example, the deviation detection device may receive the sensor parameters every 0.1 ms. Correspondingly, when obtaining the horizontal acceleration at each time point of the pre-determined time period, the deviation detection device may use a time point of the pre-determined time period at which a sensor parameter is received as each time point of the pre-determined time period, and the horizontal acceleration at each time point is obtained according to the sensor parameter received at each time point.

Step 202: Obtaining an initial moving speed of the image capturing device, the initial moving speed being a moving speed of the image capturing device in a horizontal direction at a start time point of the pre-determined time period.

In one embodiment of the present disclosure, the deviation detection device may continuously obtain horizontal accelerations of the image capturing device, and calculate, starting from the speed of the image capturing device being 0, moving speeds of the image capturing device in the horizontal direction at all time points with reference to the horizontal accelerations of the image capturing device. When obtaining the initial moving speed, the deviation detection device may obtain a horizontal moving speed whose corresponding time point is closest to an initial time point of the pre-determined time period and determine the horizontal moving speed as the initial moving speed.

Because the deviation detection device receives the sensor parameters and determines the horizontal accelerations both according to a time interval, in one embodiment of the present disclosure, the deviation detection device may consider, by default, that a horizontal acceleration of the image capturing device between corresponding time points at which two adjacent horizontal accelerations are determined remains unchanged, and the horizontal acceleration is equal to the determined latter horizontal acceleration in the two adjacent horizontal accelerations. If knowing a horizontal moving speed $v_1$ at the time point corresponding to the determined former horizontal acceleration, the deviation detection device can determine a horizontal moving speed $v_2$ at the time point corresponding to the determined latter horizontal acceleration of the image capturing device according to the determined latter horizontal acceleration a and a time interval Δt between the two adjacent time points and with reference to a calculation formula between an acceleration and a speed.

Specifically, assuming that a time interval between two adjacent time points at which the deviation detection device receives sensor data is 0.1 ms, a horizontal moving speed of the image capturing device is 0 and a horizontal acceleration is also 0 when a time point is 0 ms. At 0.1 ms, the deviation detection device receives sensor data, determines the horizontal acceleration at 0.1 ms, and calculates a horizontal moving speed at 0.1 ms with reference to the horizontal moving speed at 0 ms, the horizontal acceleration at 0.1 ms and the time interval (that is, 0.1 ms). At 0.2 ms, the deviation detection device receives sensor data, determines a horizontal acceleration at 0.2 ms, and calculates a horizontal moving speed at 0.2 ms with reference to the horizontal moving speed at 0.1 ms, the horizontal acceleration at 0.2 ms and the time interval. The rest can be deducted through analogy. The deviation detection device calculates a horizontal moving speed every 0.1 ms.

Step 203: Calculating a horizontal moving speed of the image capturing device at each time point according to the initial moving speed of the image capturing device and the horizontal acceleration at each time point of the pre-determined time period.

Specifically, each time point of the pre-determined time period is also a time point at which the deviation detection device receives a sensor parameter. In addition, a method used by the deviation detection device to calculate the horizontal moving speed at each time point according to the initial moving speed and the horizontal acceleration at each time point of the pre-determined time period is the same as the manner in which the deviation detection device calculates the moving speed in the horizontal direction at each time point in Step 202, and details are not described herein again.

Step 204: Determining a horizontal straight-forward direction of the vehicle according to the horizontal moving speeds of the image capturing device at the time points.

In one embodiment of the present disclosure, because the horizontal moving speed is a vector, when determining the horizontal straight-forward direction of the vehicle, the deviation detection device may aggregate the horizontal moving speeds of the image capturing device at the time points, and use a direction of the aggregated horizontal moving speed as the horizontal straight-forward direction of the vehicle.

Specifically, when aggregating the horizontal moving speeds at the time points, the deviation detection device may sample the horizontal moving speeds at the time points according to a pre-determined sampling frequency, to obtain horizontal moving speeds at several sampled time points, and perform vector summation on the horizontal moving speeds at the several sampled time points, to obtain an aggregated horizontal moving speed.

When the vehicle is moving, the vehicle moves in the straight-forward direction for most of the time and rarely turns or reverses. In other words, directions of most of the horizontal moving speeds at the several sampled time points are the same or close to the horizontal straight-forward direction of the vehicle, and a speed value of the vehicle during movement in the straight-forward direction is usually greater than a speed value during turning or reversing. Thus, after vector summation is performed on the horizontal moving speeds at the several sampled time points, a difference between the direction of the obtained aggregated horizontal moving speed and the horizontal straight-forward direction of the vehicle is very slight in most cases, and the direction of the aggregated horizontal moving speed may be considered as the horizontal straight-forward direction of the vehicle.

It should be noted that, in one embodiment of the present disclosure, Step 204 may be performed after horizontal accelerations at all time points of the pre-determined time period are obtained.

Alternatively, the deviation detection device obtains, starting from a start time point of the pre-determined time period, a horizontal acceleration at each time point according to the initial moving speed. That is, the deviation detection device calculates a horizontal moving speed at the time point, and modifies the horizontal straight-forward direction of the vehicle according to the calculated horizontal moving speed. At the end of the pre-determined time period, the deviation detection device locks a latest modified horizontal straight-forward direction of the vehicle, and performs a subsequent step according to the locked horizontal straight-forward direction of the vehicle.

Step 205: Determining a target photographing direction of the image capturing device according to the horizontal straight-forward direction of the vehicle and a pre-determined relationship between the horizontal straight-forward direction and the target photographing direction.

The pre-determined relationship between the horizontal straight-forward direction and the target photographing direction may be preset by a user. For example, the pre-determined relationship may include an angle between the horizontal straight-forward direction and the target photographing direction. Using an example in which the image capturing device is an image capturing assembly in a driving recorder, and the deviation detection device is a computing assembly in the driving recorder, the driving recorder may provide a pre-determined relationship setting interface, for setting an angle between the target photographing direction of the driving recorder and the straight-forward direction of the vehicle (for example, an automobile) on the setting interface. For example, the user may set the target photographing direction to be the horizontal straight-forward direction of the vehicle (where in this case, the angle in the pre-determined relationship is 0). Alternatively, the user may set that an angle exists between the target photographing direction and the horizontal straight-forward direction of the vehicle. For example, the target photographing direction deviates leftward or rightward from the horizontal straight-forward direction of the vehicle by 5 degrees (where in this case, the angle in the pre-determined relationship is 5 degrees leftward or rightward), and the like.

Step 206: Detecting whether the direction angle satisfies a preset condition, the direction angle being an angle between the target photographing direction and an actual photographing direction of the image capturing device at an end time point of the pre-determined time period.

The preset condition includes at least one of the following conditions: the direction angle is greater than a first preset angle threshold; a component of the direction angle in a horizontal plane is greater than a second preset angle threshold; and a component of the direction angle in a vertical plane is greater than a third preset angle threshold.

The first preset angle threshold, the second preset angle threshold, and the third preset angle threshold may be angle values of the image capturing device preset at delivery, or may be angle values set by the user.

Figure 4:
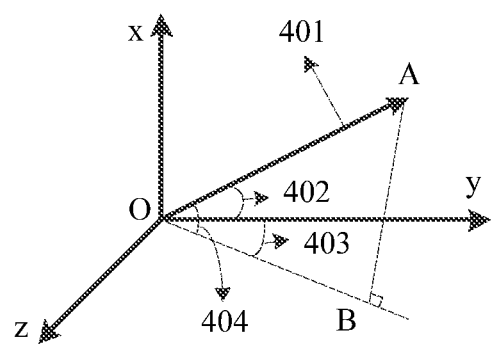
FIG. 4 is a schematic diagram of a direction angle in the solution according to the method shown in FIG. 2.

Specifically, FIG. 4 is a schematic diagram of a direction angle according to an embodiment of the present disclosure. In a space coordinate system in FIG. 4, an origin is an O point, a y-axis is the target photographing direction, a yOz plane is a horizontal plane, an x-axis is perpendicular to the horizontal plane, a direction corresponding to a space vector 401 is the actual photographing direction of the image capturing device, an angle 402 between the space vector 401 and the y-axis is a direction angle between the target photographing direction and the actual photographing direction of the image capturing device, a perpendicular line of the yOz plane is drawn from an apex A of the space vector 401, and the perpendicular line passes a B point in the yOz plane. In this way, an angle 403 between the y-axis and a line between the two points O and B is a component of the angle 402 in the horizontal plane, and an angle 404 between the space vector 401 and the two points O and B is a component of the angle 402 in a vertical plane.

In actual applications, the deviation detection device may detect whether a deviation angle of the actual photographing direction relative to the target photographing direction in the three-dimensional space satisfies the preset condition. Using FIG. 4 as an example, the deviation detection device may detect whether an angle value of the angle 402 is greater than the first preset angle threshold. If the angle value of the angle 402 is greater than the first preset angle threshold, the deviation detection device determines that the direction angle between the target photographing direction and the actual photographing direction satisfies the preset condition.

Alternatively, the deviation detection device may detect whether a deviation angle of the actual photographing direction relative to the target photographing direction in a horizontal direction satisfies the preset condition. Using FIG. 4 as an example, the deviation detection device may detect whether an angle value of the angle 403 is greater than the second preset angle threshold. If the angle value of the angle 403 is greater than the second preset angle threshold, the deviation detection device determines that the direction angle between the target photographing direction and the actual photographing direction satisfies the preset condition.

Alternatively, the deviation detection device may detect whether a deviation angle of the actual photographing direction relative to the target photographing direction in a vertical direction satisfies the preset condition. Using FIG. 4 as an example, the deviation detection device may detect whether an angle value of the angle 404 is greater than the third preset angle threshold. If the angle value of the angle 404 is greater than the third preset angle threshold, the deviation detection device determines that the direction angle between the target photographing direction and the actual photographing direction satisfies the preset condition.

Alternatively, the deviation detection device may determine whether the preset condition is satisfied with reference to any two or three of deviation angles of the actual photographing direction relative to the target photographing direction in the three-dimensional space, the horizontal direction, or the vertical direction. That is, when the any two or three of the deviation angles are greater than corresponding preset angle thresholds, the deviation detection device determines that the direction angle between the target photographing direction and the actual photographing direction satisfies the preset condition.

Step 207: Determining that the actual photographing direction of the image capturing device deviates if the direction angle satisfies the preset condition.

After determining that the direction angle between the target photographing direction and the actual photographing direction is excessively large, the deviation detection device may consider that the actual photographing direction of the image capturing device significantly deviates, and the deviation may affect an image capturing effect. In this case, the subsequent Step 208 or Step 209 may be performed.

Step 208: Sending a prompt message to a user terminal, the prompt message being used for indicating that the actual photographing direction of the image capturing device deviates.

Specifically, when the image capturing device is incapable of adjusting the photographing direction, the deviation detection device may send the prompt message to the user terminal, for example, may send an instant messaging message or a notification message to an instant messaging application installed in the terminal, to indicate that the actual photographing direction of the image capturing device deviates relative to the target photographing direction, so that the user manually corrects the actual photographing direction of the image capturing device in time. Optionally, the prompt message may further include the direction angle between the target photographing direction and the actual photographing direction. Further, the prompt message may further include a suggested to-be-adjusted direction, angle, and the like.

Step 209: Correcting the actual photographing direction of the image capturing device according to the direction angle.

In another possible implementation, if the image capturing device is capable of adjusting the photographing direction, the deviation detection device may adjust the actual photographing direction of the image capturing device according to the direction angle, to adjust the actual photographing direction of the image capturing device to the target photographing direction.

For example, if the image capturing device includes a servo motor configured to adjust an attitude of the image capturing device, the deviation detection device may control running of the servo motor according to the direction angle, to adjust the device attitude of the image capturing device, so that the actual photographing direction of the image capturing device is close to or the same as the target photographing direction.

Figure 5:
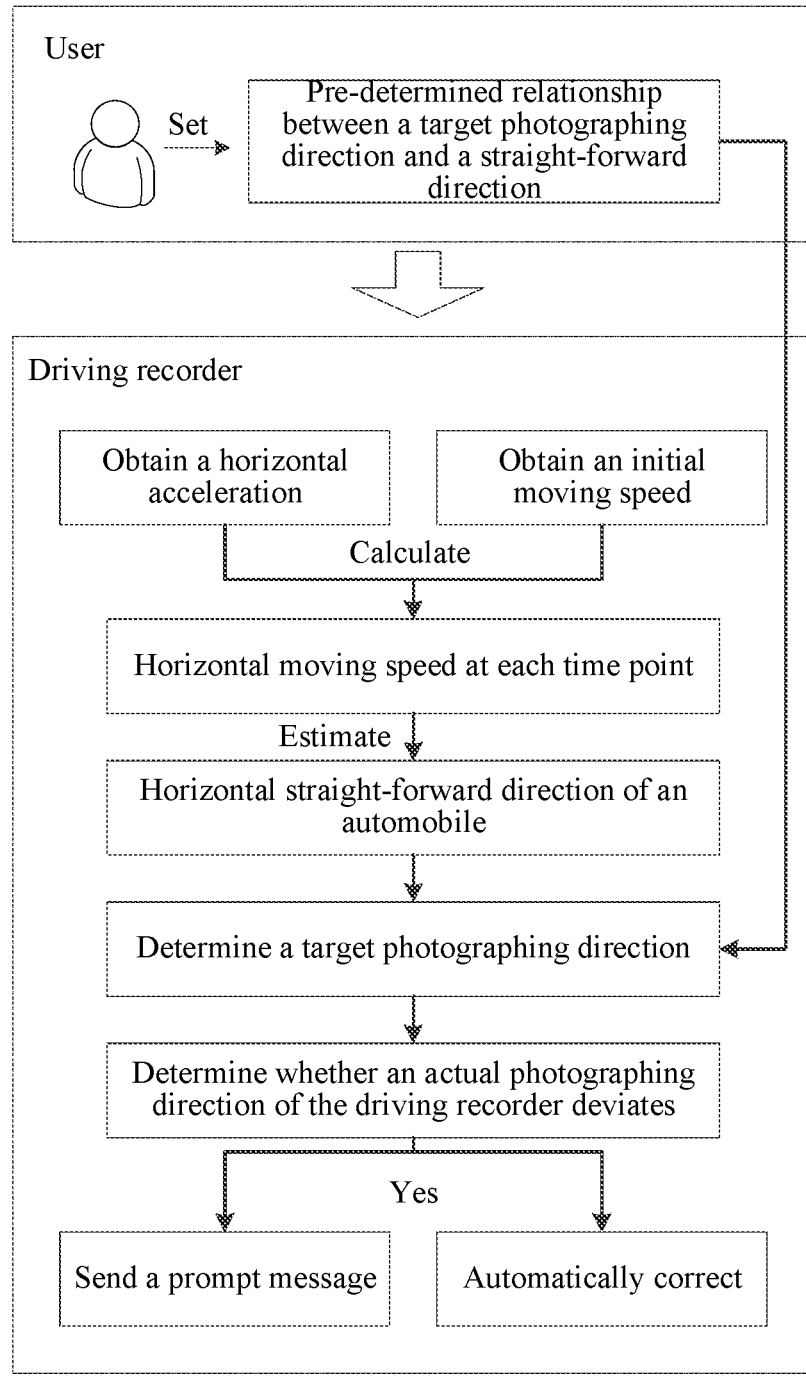
FIG. 5 is a schematic flowchart of the solution according to the method shown in FIG. 2.

Specifically, an example is used in which the image capturing device is an image capturing assembly in a driving recorder, and the vehicle is an automobile. FIG. 5 is a schematic flowchart according to an embodiment of the present disclosure. With reference to FIG. 5, when a user mounts a driving recorder on the automobile, a pre-determined relationship between a target photographing direction and a straight-forward direction of the automobile may be set in a setting interface provided by the driving recorder (for example, the target photographing direction is set as the straight-forward direction of the automobile). Alternatively, the user may bind the driving recorder with a mobile phone, and set the pre-determined relationship between the target photographing direction and the straight-forward direction on a setting interface presented on a screen of the mobile phone.

After the setting, the pre-determined relationship is stored in the driving recorder. After being powered on, the driving recorder may continuously obtain sensor data collected by an acceleration sensor in the driving recorder, obtain a horizontal acceleration of the driving recorder according to the sensor data, and determine a moving state of the driving recorder according to the obtained horizontal acceleration. When the driving recorder is moving, a horizontal acceleration at each time point in a pre-determined time period and an initial moving speed at an initial time point of the pre-determined time period during the movement may be obtained, a horizontal moving speed at each time point of the pre-determined time period may be calculated according to the horizontal acceleration at each time point of the pre-determined time period and the initial moving speed at the initial time point of the pre-determined time period, and the straight-forward direction of the automobile may be estimated based on the horizontal moving speeds at the time points of the pre-determined time period.

The target photographing direction of the driving recorder is determined with reference to the stored pre-determined relationship, and whether the actual photographing direction of the driving recorder deviates is determined according to a direction angle between the determined target photographing direction and the actual photographing direction of the driving recorder. If the actual photographing direction of the driving recorder deviates, a prompt message is sent to the mobile phone of the user, to instruct the user to modify the photographing direction in time. Alternatively, the driving recorder may control the built-in servo motor to automatically correct the photographing direction.

Based on the above, in the method in one embodiment of the present disclosure, when the image capturing device is fixedly disposed in the vehicle, during movement of the image capturing device, the deviation detection device may obtain a direction of a horizontal acceleration of the image capturing device at each time point in a pre-determined time period, and calculate a horizontal moving speed at each time point of the pre-determined time period according to the direction of the horizontal acceleration and a horizontal moving speed at an initial time point of the pre-determined time period, to further estimate the horizontal straight-forward direction of the vehicle, determine the target photographing direction of the image capturing device according to the estimated horizontal straight-forward direction, and then detect, according to the target photographing direction of the image capturing device, whether the actual photographing direction of the image capturing device deviates. In this way, the photographing direction of the image capturing device does not need to be manually checked by the user, and timeliness and accuracy of detecting whether the photographing direction of the image capturing device deviates are improved.

In addition, after determining whether the actual photographing direction of the image capturing device deviates, the deviation detection device may send a prompt message to the user terminal, to instruct the user to adjust the photographing direction in time. Alternatively, the deviation detection device directly adjusts the photographing direction of the image capturing device, thereby improving the image capturing effect of the image capturing device.

In actual applications, the vehicle usually moves relatively fast when moving in the straight-forward direction or a near-straight-forward direction, and relatively slowly when moving in other directions. Based on this feature, in the solution in the present disclosure, when determining the horizontal straight-forward direction of the vehicle according to the horizontal moving speeds of the image capturing device at the time points, the deviation detection device may further optimize the determining process of the horizontal straight-forward direction of the vehicle according to the speed values of the horizontal moving speeds of the image capturing device at the time points, to improve accuracy of the determined horizontal straight-forward direction of the vehicle. For details, refer to FIG. 6.

Figure 6:
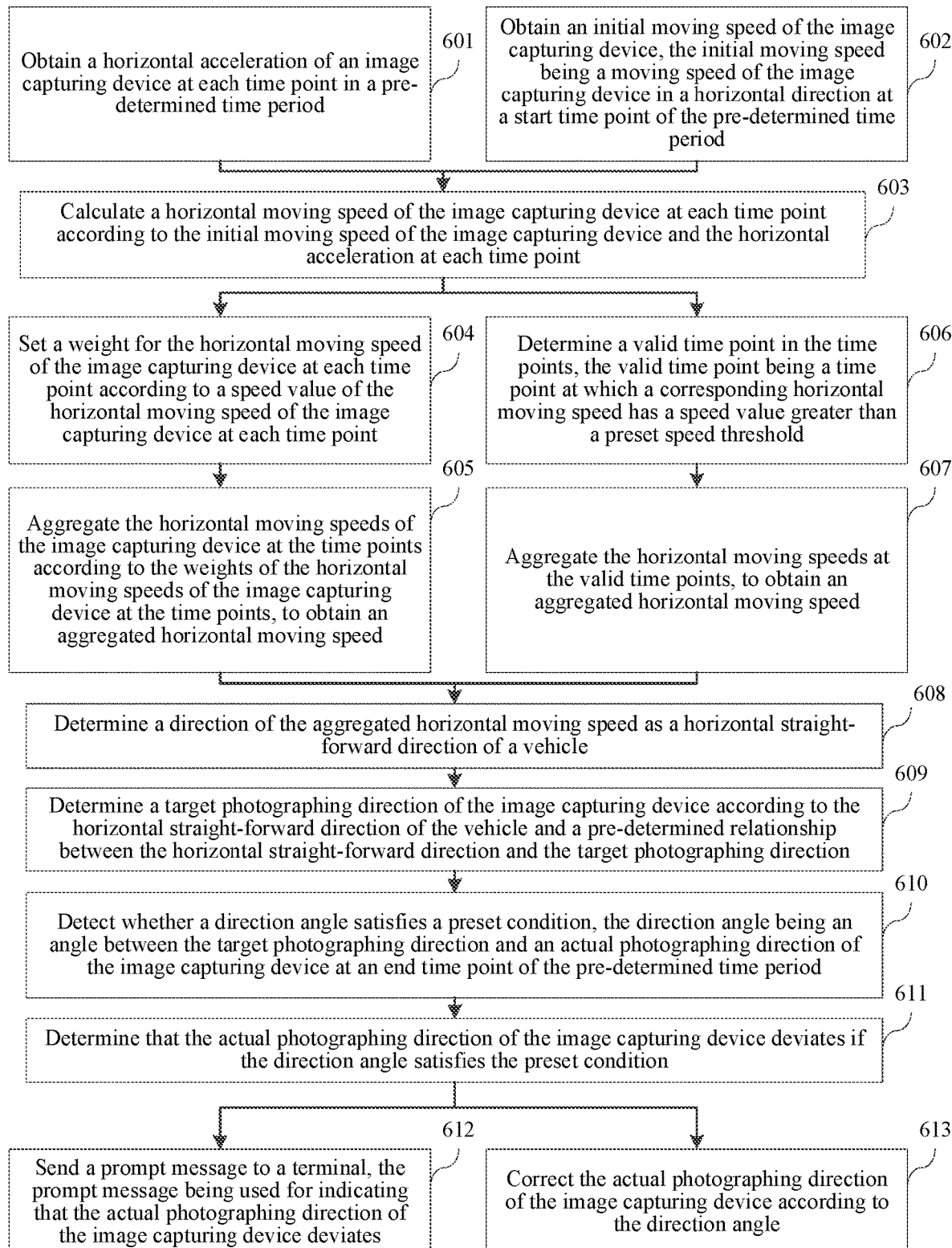
FIG. 6 is a flowchart of a photographing direction deviation detection method according to the present disclosure.

FIG. 6 is a flowchart of a photographing direction deviation detection method according to an exemplary embodiment. The method may be applied to a deviation detection device. The deviation detection device correspondingly has an image capturing device fixedly mounted in a vehicle. The photographing direction deviation detection method may include the following steps:

Step 601: Obtaining a horizontal acceleration of an image capturing device at each time point in a pre-determined time period.

Step 602: Obtaining an initial moving speed of the image capturing device, the initial moving speed being a moving speed of the image capturing device in a horizontal direction at a start time point of the pre-determined time period.

Step 603: Calculating a horizontal moving speed of the image capturing device at each time point of the pre-determined time period according to the initial moving speed of the image capturing device and the horizontal acceleration at each time point.

For a specific implementation process of step 601 to step 603, refer to the description of step 201 to step 203 in the embodiment of FIG. 2, and details are not described herein again.

After calculating the horizontal moving speed of the image capturing device at each time point, the deviation detection device may aggregate the horizontal moving speeds at the time points according to speed values of the horizontal moving speeds at the time points. For a specific aggregation process of the horizontal moving speeds, refer to the following step 604 and step 605, or refer to step 606 and step 607.

Step 604: Setting a weight for the horizontal moving speed of the image capturing device at each time point according to a speed value of the horizontal moving speed of the image capturing device at each time point.

In one embodiment of the present disclosure, the weights are set for the horizontal moving speeds corresponding to the different speed values, so that an impact of a horizontal moving speed of the vehicle during turning or reversing on the estimated horizontal straight-forward direction of the vehicle may be weakened, and an impact of a horizontal moving speed during movement of the vehicle in the straight-forward direction on the estimated horizontal straight-forward direction of the vehicle may be enhanced, thereby improving accuracy of the estimated horizontal straight-forward direction of the vehicle. Specifically, a relatively large weight may be set for a horizontal moving speed having a relatively large speed value. Correspondingly, a relatively small weight may be set for a horizontal moving speed having a relatively large speed value. The weight may be in positive correlation with the speed value. For example, Table 1 shows a correspondence between a weight and a speed value of a horizontal moving speed.

TABLE 1

| Speed value v (km/h) of a horizontal speed | Weight |
| --- | --- |
| 0 < v < 20 | 0.1 |
| 20 ≤ v ≤ 40 | 1 |
| V > 40 | 10 |

As shown in Table 1, for the horizontal moving speed at each time point of the pre-determined time period, the deviation detection device may set a weight of a horizontal moving speed having a speed value from 0 to 20 to 0.1, a weight of a horizontal moving speed having a speed value from 20 to 40 to 1, and a weight of a horizontal moving speed having a speed value greater than 40 to 10.

Step 605: Aggregating the horizontal moving speeds of the image capturing device at the time points of the pre-determined time period according to the weights of the horizontal moving speeds of the image capturing device at the time points, to obtain an aggregated horizontal moving speed.

In actual applications, the deviation detection device may multiply the horizontal moving speed at each time point by a corresponding weight, and perform vector summation on the horizontal moving speeds multiplied by the corresponding weights, to obtain an aggregated horizontal moving speed.

Optionally, to reduce calculation complexity, in actual applications, the deviation detection device may sample the horizontal moving speeds at the time points according to a pre-determined sampling frequency, to obtain horizontal moving speeds at several sampled time points, respectively multiply the horizontal moving speeds at the several sampled time points by corresponding weights, and then, perform vector summation on the products, to obtain an aggregated horizontal moving speed.

In step 604 and step 605, the horizontal moving speed of the vehicle during turning or reversing is weakened, and the horizontal moving speed during movement of the vehicle in the straight-forward direction is enhanced, thereby improving estimation accuracy of the horizontal straight-forward direction of the vehicle. In another possible implementation, a horizontal moving speed during possible movement of the vehicle in the straight-forward direction may be selected from the horizontal moving speeds at the time points, and the horizontal straight-forward direction of the vehicle is estimated according to the selected horizontal moving speed. For details, refer to step 606 and step 607.

Step 606: Determining a valid time point in the time points, the valid time point being a time point at which a corresponding horizontal moving speed has a speed value greater than a preset speed threshold.

Because a moving direction of the vehicle is usually the straight-forward direction of the vehicle when the speed value of the vehicle is relatively large, in one embodiment of the present disclosure, a time point at which a corresponding horizontal moving speed has a speed value greater than a preset speed threshold (for example, 40 km/h) may be selected from the time points as a valid time point.

Step 607: Aggregating the horizontal moving speeds at the valid time points, to obtain an aggregated horizontal moving speed.

The deviation detection device may perform vector summation on the horizontal moving speeds at the valid time points, to obtain an aggregated horizontal moving speed.

Optionally, in this step, to reduce calculation complexity, the deviation detection device may also sample the horizontal moving speeds at the time points according to a pre-determined sampling frequency, to obtain horizontal moving speeds at several sampled time points, determine a time point at which a corresponding horizontal moving speed has a speed value greater than a preset speed threshold in the several sampled time points as a valid sampled time point, and perform vector summation on the horizontal moving speeds at the valid sampled time points, to obtain an aggregated horizontal moving speed.

Step 608: Determining a direction of the aggregated horizontal moving speed as a horizontal straight-forward direction of the vehicle.

After step 605 or step 607, a difference between the aggregated horizontal moving speed and the horizontal straight-forward direction of the vehicle is very slight in most cases, and the direction of the aggregated horizontal moving speed may be regarded as the horizontal straight-forward direction of the vehicle.

Step 609: Determining a target photographing direction of the image capturing device according to the horizontal straight-forward direction of the vehicle and a pre-determined relationship between the horizontal straight-forward direction and the target photographing direction.

Step 610: Detecting whether a direction angle satisfies a preset condition, the direction angle being an angle between the target photographing direction and an actual photographing direction of the image capturing device at an end time point of the pre-determined time period.

The preset condition includes at least one of the following conditions: the direction angle is greater than a first preset angle threshold; a component of the direction angle in a horizontal plane is greater than a second preset angle threshold; and a component of the direction angle in a vertical plane is greater than a third preset angle threshold.

Step 611: Determining that the actual photographing direction of the image capturing device deviates if the direction angle satisfies the preset condition.

Step 612: Sending a prompt message to a user terminal, the prompt message being used for indicating that the actual photographing direction of the image capturing device deviates.

For a specific implementation process of step 609 to step 612, refer to the description of step 205 to step 208 in the embodiment of FIG. 2, and details are not described herein again.

Step 613: Correcting the actual photographing direction of the image capturing device according to the direction angle.

For a specific implementation process of step 613, refer to the description of step 209 in the embodiment of FIG. 2, and details are not described herein again.

Optionally, in actual applications, there may be a case in which after a user sets the target photographing direction, the user actively adjusts the actual photographing direction of the image capturing device, but does not modify the target photographing direction by using a setting interface. In this case, even if it is indicated that the actual photographing direction of the image capturing device deviates, it is likely that the user may not adjust the actual photographing direction of the image capturing device again. In one embodiment of the present disclosure, when the deviation detection device determines that the actual photographing direction deviates, the user may reset the pre-determined relationship between the horizontal straight-forward direction and the target photographing direction, so that after the pre-determined relationship is reset, the actual photographing direction of the image capturing device is consistent with a new target photographing direction determined according to the reset pre-determined relationship.

The resetting the pre-determined relationship may be that resetting a direction angle between the horizontal straight-forward direction and the target photographing direction included in the pre-determined relationship. For example, after the user manually adjusts the actual photographing direction of the image capturing device and the vehicle has traveled for a period of time, the user may send, by using a setting interface provided by the user terminal or the deviation detection device, an instruction for resetting the pre-determined relationship. After receiving instruction for resetting the pre-determined relationship, the deviation detection device may update the direction angle between the horizontal straight-forward direction and the target photographing direction included in the pre-determined relationship to the direction angle between the horizontal straight-forward direction of the vehicle and the actual photographing direction of the image capturing device calculated in step 608. During subsequent detection, if the actual photographing direction of the image capturing device is not significantly changed, the target photographing direction determined according to the reset pre-determined relationship is consistent with the actual photographing direction of the image capturing device.

Alternatively, in another implementation scenario, after the user terminal receives a prompt message, if the user does not need to adjust an actual photographing angle of the image capturing device and does not hope to frequently receive prompt messages, the user may send, by using the setting interface provided by the user terminal or the deviation detection device, the instruction for resetting the pre-determined relationship.

Specifically, an example is used in which the image capturing device is an image capturing assembly in a driving recorder, and the vehicle is an automobile. When mounting a driving recorder in the automobile, the user may set a pre-determined relationship (that is, an angle between the target photographing direction and the horizontal straight-forward direction). After the setting is completed, the driving recorder stores the pre-determined relationship. When the driving recorder is moving, a horizontal acceleration at each time point in a pre-determined time period during the movement may be obtained, a horizontal moving speed at each time point of the pre-determined time period may be calculated according to the horizontal acceleration at each time point of the pre-determined time period and an horizontal moving speed at an initial time point of the pre-determined time period, and the straight-forward direction of the automobile may be estimated based on the horizontal moving speeds at the time points of the pre-determined time period. The target photographing direction of the driving recorder is determined with reference to the stored pre-determined relationship, and whether the actual photographing direction of the driving recorder deviates is determined according to a direction angle between the target photographing direction and the actual photographing direction of the driving recorder. If the actual photographing direction of the driving recorder deviates, a prompt message is sent to a mobile phone of the user, to instruct the user to perform modification in time. If receiving an instruction that is for resetting the pre-determined relationship and that is sent by the user by using the mobile phone, the driving recorder sets the direction angle between the actual photographing direction of the driving recorder and the estimated straight-forward direction of the automobile to the new pre-determined relationship.

Based on the above, in the method in one embodiment of the present disclosure, when the image capturing device is fixedly disposed in the vehicle, during movement of the image capturing device, the deviation detection device may obtain a direction of a horizontal acceleration of the image capturing device at each time point in a pre-determined time period, and calculate a horizontal moving speed at each time point of the pre-determined time period according to the direction of the horizontal acceleration and a horizontal moving speed at an initial time point of the pre-determined time period, to further estimate the horizontal straight-forward direction of the vehicle, determine the target photographing direction of the image capturing device according to the estimated horizontal straight-forward direction, and then detect, according to the target photographing direction of the image capturing device, whether the actual photographing direction of the image capturing device deviates. In this way, the photographing direction of the image capturing device does not need to be manually checked by the user, and timeliness and accuracy of detecting whether the photographing direction of the image capturing device deviates are improved.

In addition, after determining whether the actual photographing direction of the image capturing device deviates, the deviation detection device may send a prompt message to the user terminal, to instruct the user to adjust the photographing direction in time. Alternatively, the deviation detection device directly adjusts the photographing direction of the image capturing device, thereby improving the image capturing effect of the image capturing device.

In addition, according to the method in one embodiment of the present disclosure, when determining the horizontal straight-forward direction of the vehicle according to the horizontal moving speeds of the image capturing device at the time points, the deviation detection device optimizes the determining process of the horizontal straight-forward direction of the vehicle according to the speed values of the horizontal moving speeds of the image capturing device at the time points, to improve accuracy of the determined horizontal straight-forward direction of the vehicle.

In addition, in the method in one embodiment of the present disclosure, after sending the prompt message to the user, if the user does not adjust the actual photographing direction of the image capturing device, but sends the instruction for resetting the re-determined relationship, the deviation detection device updates the pre-determined relationship according to the direction angle between the actual photographing direction and the estimated straight-forward direction of the vehicle. In this way, it is avoided that prompt messages are frequently sent when the user does not adjust the actual photographing direction of the image capturing device, thereby reducing interruption on the user and simplifying operation steps of resetting the pre-determined relationship by the user.

Figure 7:
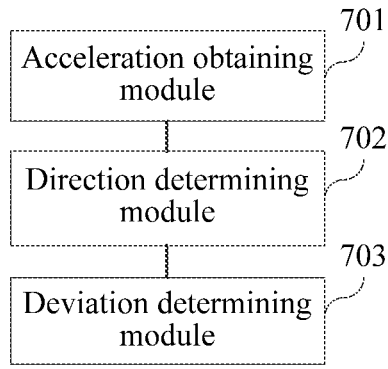
FIG. 7 is a structural block diagram of a photographing direction deviation detection apparatus according to the present disclosure.

FIG. 7 is a structural block diagram of a photographing direction deviation detection apparatus according to an exemplary embodiment. The photographing direction deviation detection apparatus may be used in an image detection device disposed in a vehicle, to implement all or some steps of the embodiment of FIG. 2 or FIG. 6. The photographing direction deviation detection apparatus may include: an acceleration obtaining module 701, a direction determining module 702, and a deviation determining module 703.

The acceleration obtaining module 701 is configured to obtain a horizontal acceleration of an image capturing device at each time point in a pre-determined time period. The direction determining module 702 is configured to determine a target photographing direction of the image capturing device according to the horizontal accelerations at the time points. The deviation determining module 703 is configured to determine, when a direction angle satisfies a preset condition, that an actual photographing direction of the image capturing device deviates, the direction angle being an angle between the target photographing direction and the actual photographing direction of the image capturing device at an end time point of the pre-determined time period.

Optionally, the preset condition includes at least one of the following conditions: the direction angle is greater than a first preset angle threshold; a component of the direction angle in a horizontal plane is greater than a second preset angle threshold; and a component of the direction angle in a vertical plane is greater than a third preset angle threshold.

Optionally, the image capturing device is fixedly disposed in a vehicle, and the direction determining module includes: a speed obtaining unit, a speed calculation unit, a first direction determining unit, and a second direction determining unit.

The speed obtaining unit is configured to obtain an initial moving speed of the image capturing device, the initial moving speed being a moving speed of the image capturing device in a horizontal direction at a start time point of the pre-determined time period. The speed calculation unit is configured to calculate a horizontal moving speed of the image capturing device at each time point according to the initial moving speed of the image capturing device and the horizontal acceleration at each time point.

The first direction determining unit is configured to determine a horizontal straight-forward direction of the vehicle according to the horizontal moving speeds of the image capturing device at the time points. The second direction determining unit is configured to determine the target photographing direction according to the horizontal straight-forward direction of the vehicle and a pre-determined relationship between the horizontal straight-forward direction of the vehicle and the target photographing direction.

Optionally, the first direction determining unit includes: a weight setting subunit, a first aggregation subunit, and a first determining subunit.

The weight setting subunit is configured to a weight for the horizontal moving speed of the image capturing device at each time point according to a speed value of the horizontal moving speed of the image capturing device at each time point, the weight being in positive correlation with the speed value.

The first aggregation subunit is configured to aggregate the horizontal moving speeds of the image capturing device at the time points according to the weights of the horizontal moving speeds of the image capturing device at the time points, to obtain an aggregated horizontal moving speed. The first determining subunit is configured to determine a direction of the aggregated horizontal moving speed as the horizontal straight-forward direction of the vehicle.

Optionally, the first direction determining unit includes: a second determining subunit, a second aggregation subunit, and a third determining subunit.

The second determining subunit is configured to determine a valid time point in the time points, the valid time point being a time point at which a corresponding horizontal moving speed has a speed value greater than a preset speed threshold. The second aggregation subunit, configured to aggregate the horizontal moving speeds at the valid time points, to obtain an aggregated horizontal moving speed. The third determining subunit, configured to determine a direction of the aggregated horizontal moving speed as the horizontal straight-forward direction of the vehicle.

Optionally, the pre-determined relationship includes an angle between the horizontal straight-forward direction and the target photographing direction, and the apparatus further includes a relationship update module, configured to update the angle between the horizontal straight-forward direction and the target photographing direction included in the pre-determined relationship to the direction angle when receiving an instruction for resetting the pre-determined relationship.

Optionally, the apparatus further includes a message sending module, configured to send a prompt message to a terminal after it is determined that the actual photographing direction of the image capturing device deviates, the prompt message being used for indicating that the actual photographing direction of the image capturing device deviates.

Optionally, the apparatus further includes a correction module, configured to correct the actual photographing direction of the image capturing device according to the direction angle after it is determined that the actual photographing direction of the image capturing device deviates.

Optionally, the deviation detection device is a driving recorder, and the image capturing device is an image capturing assembly in the driving recorder.

Figure 8:
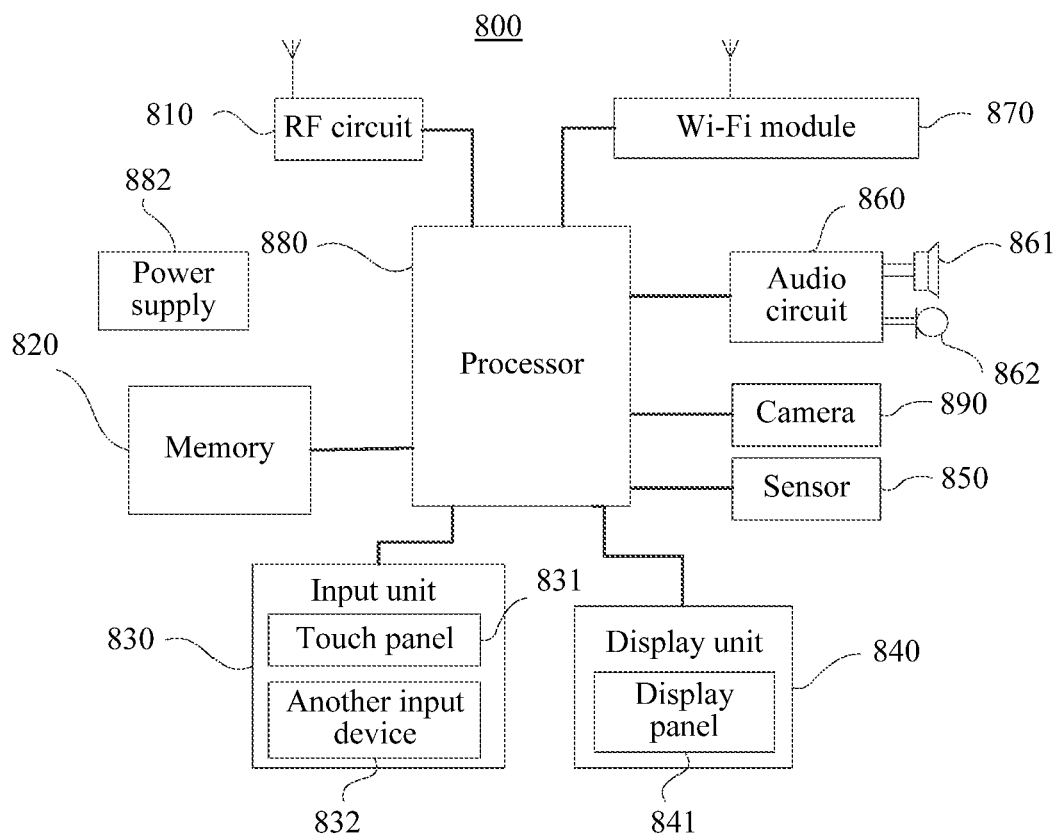
FIG. 8 is a schematic structural diagram of a device according to the present disclosure.

FIG. 8 is a schematic structural diagram of a device 800 according to an exemplary embodiment. The device 800 in one embodiment of the present disclosure may include one or more components as follows: a processor configured to execute a computer program instruction to complete various processes and methods, a random access memory (RAM) and a read only memory (ROM) that are configured to store information and a program instruction, a memory configured to store data and information, an I/O device, an interface, an antenna, or the like.

The device 800 may include components such as a radio frequency (RF) circuit 810, a memory 820, an input unit 830, a display unit 840, a sensor 850, an audio circuit 860, a Wireless Fidelity (Wi-Fi) module 870, a processor 880, a power supply 882, and a camera 890. A person skilled in the art may understand that the structure of the device shown in FIG. 8 does not constitute a limitation to the device, and the device may include more components or fewer components than those shown in the figure, or some components may be combined, or a different component deployment may be used.

The following describes the components of the device 800 in detail with reference to FIG. 8.

The RF circuit 810 may be configured to receive and send signals during an information receiving and sending process or a call process. Specifically, the RF circuit 810 receives downlink information from a base station, then delivers the downlink information to the processor 880 for processing, and sends related uplink data to the base station. Generally, the RF circuit includes, but is not limited to, an antenna, at least one amplifier, a transceiver, a coupler, a low noise amplifier (LNA), a duplexer, and the like. In addition, the RF circuit 810 may also communicate with a network and another device by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 820 may be configured to store a software program and module. The processor 880 runs the software program and module stored in the memory 820, to perform various functional applications and data processing of the device 800. The memory 820 may mainly include a program storage area and a data storage area. The program storage area may store an operating system, an application program required by at least one function (such as a sound playback function and an image display function), and the like. The data storage area may store data (such as audio data and an address book) created according to the use of the device 800, and the like. In addition, the memory 820 may include a high-speed random-access memory, and may further include a non-volatile memory such as at least one magnetic disk storage device or a flash memory device, or another volatile solid storage device.

The input unit 830 may be configured to receive input digit or character information, and generate a keyboard signal input related to the user setting and function control of the device 800. Specifically, the input unit 830 may include a touch panel 831 and another input device 832. The touch panel 831 may also be referred to as a touchscreen, and may collect a touch operation of a user on or near the touch panel (such as an operation of a user on or near the touch panel 831 by using any suitable object or attachment, such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 880. In addition, the touch controller can receive a command sent by the processor 880 and execute the command. In addition, the touch panel 831 may be a resistive, capacitive, infrared, or surface sound wave type touch panel. In addition to the touch panel 831, the input unit 830 may further include another input device 832. Specifically, the input device 832 may include, but is not limited to, one or more of a physical keyboard, a functional key (such as a volume control key or a switch key), a track ball, a mouse, and a joystick.

The display unit 840 may be configured to display information entered by the user or information provided for the user, and various menus of the device 800. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 831 transfers the touch operation to the processor 880, to determine a type of a touch event. Then, the processor 880 provides a corresponding visual output on the display panel 841 according to the type of the touch event. Although in FIG. 8, the touch panel 831 and the display panel 841 are used as two separate parts to implement input and output functions of the device 800, in some embodiments, the touch panel 831 and the display panel 841 may be integrated to implement the input and output functions of the device 800.

The device 800 may further include at least one sensor 850, such as a gyro sensor, a magnetic induction sensor, an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the device 800 is moved to the ear. As one type of motion sensor, an acceleration sensor may detect magnitude of accelerations in various directions (which generally are triaxial), may detect magnitude and a direction of the gravity when static, and may be configured to identify an application of a device attitude (such as switchover between horizontal and vertical screens, a related game, and attitude calibration of a magnetometer), a related function of vibration identification (such as a pedometer and a knock). Other sensors, such as a barometer, a hygrometer, a thermometer, and an infrared sensor, that may be configured in the electronic device 800 are not further described herein.

The audio circuit 860, a speaker 861, and a microphone 862 may provide audio interfaces between the user and the device 800. The audio circuit 860 may convert received audio data into an electrical signal and transmit the electrical signal to the speaker 861. The speaker 861 converts the electrical signal into a sound signal for output. On the other hand, the microphone 862 converts a collected sound signal into an electrical signal. The audio circuit 860 receives the electrical signal, converts the electrical signal into audio data, and outputs the audio data to the processor 880 for processing. Then, the processor 880 sends the audio data to, for example, another device by using the RF circuit 810, or outputs the audio data to the memory 820 for further processing.

The Wi-Fi is based on a short distance wireless transmission technology. The device 800 may help, by using the Wi-Fi module 870, the user to receive and send e-mails, browse a web page, access streaming media, and so on, which provides wireless broadband Internet access for the user. Although FIG. 8 shows the Wi-Fi module 870, it may be understood that the Wi-Fi module 870 is not a mandatory component of the device 800, and when required, the Wi-Fi module 870 may be omitted as long as the scope of the essence of the present disclosure is not changed.

The processor 880 is the control center of the device 800, and is connected to various parts of the device by using various interfaces and lines. By running or executing the software program and/or module stored in the memory 820, and invoking data stored in the memory 820, the processor 880 performs various functions and data processing of the device 800, thereby performing overall monitoring on the device. Optionally, the processor 880 may include one or more processing units. Preferably, the processor 880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 880.

The device 800 further includes the power supply 882 (such as a battery) supplying power to the components. Preferably, the power supply may be logically connected to the processor 880 by using a power supply management system, so as to implement functions such as management of charging, discharging, and energy consumption by using the power supply management system.

The camera 890 usually includes a lens, an image sensor, an interface, a digital signal processor, a central processing unit (CPU), a display screen, and the like. The lens is fixed above the image sensor, and the focus can be changed by manually adjusting the lens. The image sensor is equivalent to a "film" of a conventional camera and is a core for the camera to capture an image. The interface is configured to connect the camera to a motherboard of a device by using a cable and a board-to-board connector in a spring-type connection manner, and send a captured image to the memory 820. The digital signal processor processes the captured image by performing a mathematical operation, converts a captured analog image into a digital image, and sends the digital image to the memory 820 through the interface.

Although not shown in the figure, the device 800 may further include a Bluetooth module and the like. Details are not further described herein.

In addition to the one or more processors 880, the device 800 further includes a memory and one or more modules. The one or more modules are stored in the memory, and are configured to be executed by the one or more processors, to implement all or some steps of the method according to FIG. 2 or FIG. 6.

In an exemplary embodiment, a non-transitory computer readable storage medium including an instruction is further provided, for example, a memory including an instruction, and the foregoing instruction may be executed by a processor in a deviation detection device to implement the photographing direction deviation detection method according to the embodiments of the present disclosure. For example, the non-transitory computer readable storage medium may be a ROM, a RAM, a CD-ROM, a magnetic tape, a floppy disk, an optical data storage device, or the like.

A person skilled in the art can easily figure out another implementation solution of the present disclosure after considering the specification and practicing the present disclosure that is disclosed herein. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as merely exemplary, and the real scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A photographing direction deviation detection method, comprising:
   obtaining, by a deviation detection device, a horizontal acceleration of an image capturing device at each of a plurality of time points in a pre-determined time period;
   calculating, by the deviation detection device, a horizontal moving speed of the image capturing device at each of the plurality of time points according to the horizontal acceleration;
   setting, by the deviation detection device, a weight for the horizontal moving speed at each of the plurality of time points;
   obtaining, by the deviation detection device, an aggregated horizontal moving speed of the pre-determined time period according to the horizontal moving speed and the weight for the horizontal moving speed at each of the plurality of time points;
   determining, by the deviation detection device, a target photographing direction of the image capturing device according to the aggregated horizontal moving speed
   calculating a direction angle between the target photographing direction and an actual photographic direction of the image capturing device; and
   when the direction angle satisfies a preset condition, determining, by the deviation detection device, that the actual photographing direction of the image capturing device deviates.

2. The method according to claim 1, wherein the image capturing device is fixedly disposed in a vehicle, and the determining, by the deviation detection device, the target photographing direction of the image capturing device according to the horizontal acceleration at each of the time points comprises:
   obtaining, by the deviation detection device, an initial moving speed of the image capturing device, the initial moving speed being a moving speed of the image capturing device in a horizontal direction at a start time point of the pre-determined time period;
   calculating, by the deviation detection device, the horizontal moving speed of the image capturing device at each of the plurality of time points according to the initial moving speed of the image capturing device and the horizontal acceleration at each of the plurality of time points;
   determining, by the deviation detection device, a horizontal straight-forward direction of the vehicle according to the horizontal moving speed of the image capturing device at each of the plurality of time points; and
   determining, by the deviation detection device, the target photographing direction of the image capturing device according to the horizontal straight-forward direction of the vehicle and a pre-determined relationship between the horizontal straight-forward direction and the target photographing direction.

3. The method according to claim 2, wherein the determining, by the deviation detection device, the horizontal straight-forward direction of the vehicle according to the horizontal moving speed of the image capturing device at each of the plurality of time points comprises:
   determining, by the deviation detection device, a direction of the aggregated horizontal moving speed as the horizontal straight-forward direction of the vehicle.

4. The method according to claim 2, wherein the determining, by the deviation detection device, the horizontal straight-forward direction of the vehicle according to the horizontal moving speed of the image capturing device at each of the time points comprises:
   determining, by the deviation detection device, one or more valid time points among the plurality of time points, the one or more valid time points each being a time point at which a corresponding horizontal moving speed has a speed value greater than a preset speed threshold;
   obtaining, by the deviation detection device, the aggregated horizontal moving speed further according to the corresponding horizontal moving speed at each of the one or more valid time points; and
   determining, by the deviation detection device, a direction of the aggregated horizontal moving speed as the horizontal straight-forward direction of the vehicle.

5. The method according to claim 2, wherein the pre-determined relationship comprises an angle between the horizontal straight-forward direction and the target photographing direction, and the method further comprises:
   updating, by the deviation detection device, the angle between the horizontal straight-forward direction and the target photographing direction comprised in the pre-determined relationship to the direction angle when receiving an instruction for resetting the pre-determined relationship.

6. The method according to claim 1, wherein, after the deviation detection device determines that the actual photographing direction of the image capturing device deviates, the method further comprises:
   sending, by the deviation detection device, a prompt message to a user terminal, the prompt message being used for indicating that the actual photographing direction of the image capturing device deviates.

7. The method according to claim 1, wherein after the deviation detection device determines that the actual photographing direction of the image capturing device deviates, the method further comprises:
   correcting, by the deviation detection device, the actual photographing direction of the image capturing device according to the direction angle.

8. The method according to claim 1, wherein the preset condition comprises at least one of the following conditions:
   the direction angle is greater than a first preset angle threshold;
   a component of the direction angle in a horizontal plane is greater than a second preset angle threshold; and
   a component of the direction angle in a vertical plane is greater than a third preset angle threshold.

9. The method according to claim 1, wherein the horizontal moving speed includes a first speed and a second speed greater in value than the first speed, and wherein the weight includes a first weight corresponding to the first speed and a second weight corresponding to the second speed, the second weight being greater in value than the first weight.

10. A photographing direction deviation detection apparatus, comprising: an image capturing device for capturing images in an actual photographing direction; and a deviation detection device for determining whether the actual photographing direction deviates from a target photographing direction, wherein the deviation detection device is configured to perform:
   obtaining a horizontal acceleration of an image capturing device at each of a plurality of time points in a pre-determined time period;
   calculating a horizontal moving speed of the image capturing device at each of the plurality of time points according to the horizontal acceleration;
   setting a weight for the horizontal moving speed at each of the plurality of time points;
   obtaining an aggregated horizontal moving speed of the pre-determined time period according to the horizontal moving speed and the weight for the horizontal moving speed at each of the plurality of time points;
   determining a target photographing direction of the image capturing device according to the aggregated horizontal moving speed
   calculating a direction angle between the target photographing direction and an actual photographic direction of the image capturing device; and
   when the direction angle satisfies a preset condition, determining that the actual photographing direction of the image capturing device deviates.

11. The apparatus according to claim 10, wherein the image capturing device is fixedly disposed in a vehicle, and the determining the target photographing direction of the image capturing device according to the horizontal acceleration at each of the time points comprises:
   obtaining an initial moving speed of the image capturing device, the initial moving speed being a moving speed of the image capturing device in a horizontal direction at a start time point of the pre-determined time period;
   calculating the horizontal moving speed of the image capturing device at each of the plurality of time points according to the initial moving speed of the image capturing device and the horizontal acceleration at each of the time points;
   determining the horizontal straight-forward direction of the vehicle according to the horizontal moving speed of the image capturing device at each of the plurality of time points; and
   determining the target photographing direction of the image capturing device according to the horizontal straight-forward direction of the vehicle and a pre-determined relationship between the horizontal straight-forward direction and the target photographing direction.

12. The apparatus according to claim 11, wherein the determining the horizontal straight-forward direction of the vehicle according to the horizontal moving speed of the image capturing device at each of the time points comprises:
   determining a direction of the aggregated horizontal moving speed as the horizontal straight-forward direction of the vehicle.

13. The apparatus according to claim 11, wherein the determining a horizontal straight-forward direction of the vehicle according to the horizontal moving speed of the image capturing device at each of the time points comprises:

determining one or more valid time points among the plurality of time points, a valid time point being a time point at which a corresponding horizontal moving speed has a speed value greater than a preset speed threshold;
   obtaining the aggregated horizontal moving speed further according to the corresponding horizontal moving speed at each of the one or more valid time points; and
   determining a direction of the aggregated horizontal moving speed as the horizontal straight-forward direction of the vehicle.

14. The apparatus according to claim 11, wherein the pre-determined relationship comprises an angle between the horizontal straight-forward direction and the target photographing direction, and the method further comprises:
   updating the angle between the horizontal straight-forward direction and the target photographing direction comprised in the pre-determined relationship to the direction angle when receiving an instruction for resetting the pre-determined relationship.

15. The apparatus according to claim 10, wherein, after determining that the actual photographing direction of the image capturing device deviates, the deviation detection device is further configured to perform:
   sending a prompt message to a user terminal, the prompt message being used for indicating that the actual photographing direction of the image capturing device deviates.

16. The apparatus according to claim 10, wherein after determining that the actual photographing direction of the image capturing device deviates, the deviation detection device is further configured to perform:
   correcting the actual photographing direction of the image capturing device according to the direction angle.

17. The apparatus according to claim 10, wherein the preset condition comprises at least one of the following conditions:
   the direction angle is greater than a first preset angle threshold;
   a component of the direction angle in a horizontal plane is greater than a second preset angle threshold; and
   a component of the direction angle in a vertical plane is greater than a third preset angle threshold.

18. A non-transitory computer-readable storage medium storing computer program instructions executable by at least one processor to perform:
   obtaining a horizontal acceleration of an image capturing device at each of a plurality of time points in a pre-determined time period, the image capturing device being configured for capturing images in an actual photographing direction;
   calculating a horizontal moving speed of the image capturing device at each of the plurality of time points according to the horizontal acceleration;
   setting a weight for the horizontal moving speed at each of the plurality of time points;
   obtaining an aggregated horizontal moving speed of the pre-determined time period according to the horizontal moving speed and the weight for the horizontal moving speed at each of the plurality of time points;
   determining a target photographing direction of the image capturing device according to the aggregated horizontal moving speed
   calculating a direction angle between the target photographing direction and an actual photographic direction of the image capturing device; and when the direction angle satisfies a preset condition, determining that the actual photographing direction of the image capturing device deviates.

19. The non-transitory computer-readable storage medium according to claim 18, wherein the image capturing device is fixedly disposed in a vehicle, and the determining the target photographing direction of the image capturing device according to the horizontal acceleration at each of the time points comprises:

obtaining an initial moving speed of the image capturing device, the initial moving speed being a moving speed of the image capturing device in a horizontal direction at a start time point of the pre-determined time period;

calculating the horizontal moving speed of the image capturing device at each of the plurality of time points according to the initial moving speed of the image capturing device and the horizontal acceleration at each of the plurality of time points;

determining a horizontal straight-forward direction of the vehicle according to the horizontal moving speed of the image capturing device at each of the plurality of time points; and determining the target photographing direction of the image capturing device according to the horizontal straight-forward direction of the vehicle and a pre-determined relationship between the horizontal straight-forward direction and the target photographing direction.

20. The non-transitory computer-readable storage medium according to claim 19, wherein the determining the horizontal straight-forward direction of the vehicle according to the horizontal moving speed of the image capturing device at each of the time points comprises:

determining a direction of the aggregated horizontal moving speed as the horizontal straight-forward direction of the vehicle.

* * * * *